US009488383B2

(12) United States Patent
Satoh et al.

(10) Patent No.: US 9,488,383 B2
(45) Date of Patent: Nov. 8, 2016

(54) HERMETICALLY SEALED GAS HEATER AND CONTINUOUS HEATING FURNACE USING HERMETICALLY SEALED GAS HEATER

(71) Applicants: Kimiyoshi Satoh, Tokyo (JP); Soichiro Kato, Tokyo (JP)

(72) Inventors: Kimiyoshi Satoh, Tokyo (JP); Soichiro Kato, Tokyo (JP)

(73) Assignee: IHI CORPORATION (JP)

( * ) Notice: Subject to any disclaimer, the term of this patent is extended or adjusted under 35 U.S.C. 154(b) by 0 days.

(21) Appl. No.: 14/138,299

(22) Filed: Dec. 23, 2013

(65) Prior Publication Data

US 2014/0106288 A1 Apr. 17, 2014

Related U.S. Application Data (63) Continuation of application No. PCT/JP2012/068583, filed on Jul. 23, 2012.

(30) Foreign Application Priority Data

Jul. 27, 2011 (JP) .................................. 2011-163866

(51) Int. Cl.
*F24H 3/10* (2006.01)
*F27B 9/06* (2006.01)
*F23D 14/12* (2006.01)
(Continued)

(52) U.S. Cl.
CPC ................ *F24H 3/105* (2013.01); *F23C 3/00* (2013.01); *F23D 14/02* (2013.01); *F23D 14/06* (2013.01); *F23D 14/125* (2013.01); *F23D 14/66* (2013.01); *F23D 14/70* (2013.01); *F27B 9/068* (2013.01); *F27B 9/10* (2013.01); *F27B 9/28* (2013.01); *F27B 9/36* (2013.01); *F27D 99/0001* (2013.01); *F23D 2900/00003* (2013.01); *F27D 2099/0011* (2013.01)

(58) Field of Classification Search
None
See application file for complete search history.

(56) References Cited

U.S. PATENT DOCUMENTS 1,916,363 A * 7/1933 Dressler ........................ 264/606
2,162,378 A * 6/1939 Cone ............................. 432/144
(Continued)

FOREIGN PATENT DOCUMENTS

CN 1595033 A 3/2005
JP 54-016827 6/1979
(Continued)

OTHER PUBLICATIONS

Office Action dated Mar. 19, 2014 issued in corresponding Taiwan Patent Application No. 101126580 with English translation.
(Continued)

Primary Examiner — Gregory Huson
Assistant Examiner — Eric Gorman
(74) Attorney, Agent, or Firm — Ostrolenk Faber LLP (57) ABSTRACT

A hermetically sealed gas heater (110) includes a heater main body, an introduction hole (132) configured to introduce a fuel gas into the heater main body, a combustion chamber (136) configured to combust the fuel gas flowing from introduction hole, and a discharge section (138) into which an exhaust gas generated by combustion in the combustion chamber is guided. The heater main body includes a radiation surface (140) heated by the exhaust gas flowing through the discharge section and configured to transfer radiant heat to a heating target (156). An ejection port (142a) configured to partially or entirely eject the exhaust gas to the heating target is formed at the radiation surface.

5 Claims, 9 Drawing Sheets (51) Int. Cl.

| | | |
|---|---|---|
| *F27B 9/10* | (2006.01) | |
| *F27B 9/26* | (2006.01) | |
| *F24C 3/04* | (2006.01) | |
| *F23D 14/02* | (2006.01) | |
| *F23D 14/06* | (2006.01) | |
| *F23D 14/66* | (2006.01) | |
| *F27B 9/36* | (2006.01) | |
| *F23D 14/70* | (2006.01) | |
| *F27B 9/28* | (2006.01) | |
| *F27D 99/00* | (2010.01) | |
| *F23C 3/00* | (2006.01) | |

(56) References Cited

U.S. PATENT DOCUMENTS

| | | | | |
|---|---|---|---|---|
| 2,810,157 | A * | 10/1957 | Slayter et al. | 65/462 |
| 3,014,235 | A * | 12/1961 | Snow | 65/460 |
| 3,228,614 | A | 1/1966 | Bauer | 239/432 |
| 3,266,485 | A * | 8/1966 | Girton | F23C 3/004 126/360.1 |
| 3,847,536 | A | 11/1974 | Lepage | 431/329 |
| 3,849,063 | A * | 11/1974 | Eichenlaub | 432/185 |
| 3,909,953 | A * | 10/1975 | Hemsath et al. | 34/450 |
| 4,025,291 | A * | 5/1977 | Black | 431/346 |
| 4,197,831 | A * | 4/1980 | Black | 122/18.2 |
| 4,353,348 | A * | 10/1982 | Black | 126/91 R |
| 4,432,336 | A * | 2/1984 | Black | 126/91 R |
| 4,569,328 | A | 2/1986 | Shukla | 126/39 |
| 4,697,530 | A * | 10/1987 | Marcotte et al. | 110/234 |
| 4,933,242 | A * | 6/1990 | Koga | B01J 19/249 429/423 |
| 5,022,379 | A * | 6/1991 | Wilson, Jr. | F28D 7/103 122/18.3 |
| 5,113,478 | A * | 5/1992 | Nakashima | F23D 11/441 392/395 |
| 5,285,967 | A * | 2/1994 | Weidman | 239/80 |
| 5,568,804 | A * | 10/1996 | Joseph | F24C 3/067 126/39 H |
| 5,730,763 | A * | 3/1998 | Manulescu et al. | 48/61 |
| 6,210,149 | B1 * | 4/2001 | Plavnik et al. | 431/1 |
| 6,629,837 | B2 * | 10/2003 | Carbone et al. | 431/354 |
| 8,590,526 | B2 * | 11/2013 | Sun | F24C 15/107 126/39 K |
| 8,662,883 | B2 * | 3/2014 | Mennie et al. | 431/5 |
| 2002/0045145 | A1 | 4/2002 | Carbone | 431/354 |
| 2006/0137677 | A1 * | 6/2006 | Burnett et al. | 126/343.5 R |
| 2006/0192026 | A1 * | 8/2006 | Noujaim | 239/79 |
| 2007/0261446 | A1 * | 11/2007 | Baker et al. | 65/453 |
| 2007/0261447 | A1 * | 11/2007 | Borsa | 65/460 |
| 2008/0050634 | A1 * | 2/2008 | Park | B01J 19/0093 429/425 |
| 2011/0048412 | A1 * | 3/2011 | Kato | F23C 3/002 126/85 R |
| 2011/0186035 | A1 * | 8/2011 | Kwon et al. | 126/39 E |
| 2012/0266758 | A1 * | 10/2012 | Lee et al. | 99/357 |
| 2012/0266860 | A1 * | 10/2012 | Kim et al. | 126/273 R |
| 2012/0266861 | A1 * | 10/2012 | Kim et al. | 126/39 E |
| 2012/0266862 | A1 * | 10/2012 | Ryu et al. | 126/39 R |
| 2013/0192591 | A1 * | 8/2013 | Satoh | F23C 3/00 126/92 AC |
| 2013/0216965 | A1 * | 8/2013 | Satoh | F23D 14/02 431/328 |
| 2014/0116423 | A1 * | 5/2014 | Satoh et al. | 126/92 AC |
| 2014/0116424 | A1 * | 5/2014 | Satoh | F23D 14/02 126/92 AC |
| 2014/0170582 | A1 * | 6/2014 | Satoh et al. | 432/147 |
| 2014/0220502 | A1 * | 8/2014 | Satoh et al. | 432/147 |
| 2015/0377553 | A1 * | 12/2015 | Satoh | F23C 3/00 432/147 |
| 2016/0018161 | A1 * | 1/2016 | Satoh | A21B 1/14 432/147 |
| 2016/0169527 | A1 * | 6/2016 | Deng | F24C 3/047 426/523 |
| 2016/0169530 | A1 * | 6/2016 | Cheng | F24C 15/10 126/39 B |
| 2016/0169533 | A1 * | 6/2016 | Deng | F24C 15/108 126/39 H |

FOREIGN PATENT DOCUMENTS

| | | | |
|---|---|---|---|
| JP | 2000-039114 | | 2/2000 |
| JP | 2002-181341 | | 6/2002 |
| JP | 2004-269242 | | 9/2004 |
| JP | 2007-212082 | | 8/2007 |
| JP | 2009-250563 | | 10/2009 |
| JP | 2013029217 A | * | 2/2013 |
| JP | 2013053810 A | * | 3/2013 |
| JP | 2013053811 A | * | 3/2013 |
| JP | 2014-129753 | | 7/2014 |

OTHER PUBLICATIONS

International Search Report and Written Opinion mailed Sep. 18, 2012 in corresponding PCT International Application No. PCT/JP2012/068583.

Office Action dated Apr. 28, 2015 issued in corresponding Chinese Patent Application No. 201280036560.1 (with English translation of Search Report only).

European Search Report, dated Feb. 17, 2015, issued in corresponding European Patent Application No. EP12817071.9. Total 6 pages.

* cited by examiner

HERMETICALLY SEALED GAS HEATER AND CONTINUOUS HEATING FURNACE USING HERMETICALLY SEALED GAS HEATER

This application is a continuation application based on a PCT Patent Application No. PCT/JP2012/068583, filed Jul. 23, 2012, whose priority is claimed on Japanese Patent Application No. 2011.163866, filed Jul. 27, 2011. The contents of both the PCT Application and the Japanese Application are incorporated herein by reference.

FIELD OF THE INVENTION

The present invention relates to a hermetically sealed gas heater having a flow path provided with a radiation surface heated by an exhaust gas and a continuous heating furnace using the hermetically sealed gas heater.

BACKGROUND ART

In the related art, gas heaters of heating a radiator with combustion heat generated by combusting a fuel gas and heating an industrial material, foods, or the like, with radiant heat from a radiation surface of the radiator have been widely distributed. For example, a technique of combusting the fuel gas ejected from a plurality of burner ports formed in the radiation surface and heating the radiation surface has been proposed (for example, Patent Document 1).

RELATED ART DOCUMENTS

Patent Documents

[Patent Document 1] Japanese Unexamined Patent Application, First Publication No. 2009-250563

DISCLOSURE OF THE INVENTION

Problems to be Solved by the Invention

Here, for example, when foods are baked, a method of removing vapor around a heating target while baking the foods may be appropriate. Further, when used for drying paint, in order to collect volatile organic compounds (VOC), flow may occur in an atmosphere around the heating target during the baking.

As described above, when flow occurs in the atmosphere around the heating target, another instrument such as a fan or the like should be installed. However, when installing the instrument, the space for installation may be restricted and the cost may be increased.

In consideration of the above-mentioned problems, it is an object of the present invention to provide a hermetically sealed gas heater capable of being manufactured at a low cost, removing restriction in the space for installation and generating flow in an atmosphere gas around the heating target, and a continuous heating furnace using the hermetically sealed gas heater.

Means for Solving the Problems

A hermetically sealed gas heater according to a first aspect of the present invention includes a heater main body; an introduction hole configured to introduce a fuel gas into the heater main body; a combustion chamber configured to combust the fuel gas introduced from the introduction hole; and a discharge section into which an exhaust gas generated by combustion in the combustion chamber is guided. In addition, the heater main body includes a radiation surface heated by the exhaust gas flowing through the discharge section and configured to transfer radiant heat to a heating target, and an ejection port configured to partially or entirely eject the exhaust gas toward the heating target is formed at the radiation surface.

The hermetically sealed gas heater according to a second aspect of the present invention, in the first aspect, the heater main body further includes a heating plate having the radiation surface; a disposition plate disposed opposite to the heating plate and having the introduction hole; an outer circumferential wall disposed along outer circumferences of the heating plate and the disposition plate; and a partition plate disposed opposite to the heating plate and the disposition plate in a space surrounded by the heating plate, the disposition plate and the outer circumferential wall, and configured to form an introduction section into which the fuel gas flowing from the introduction hole is guided by an aperture between the partition plate and the disposition plate and form the discharge section by an aperture between the partition plate and the heating plate. In addition, the combustion chamber is disposed in a space surrounded by the heating plate, the disposition plate and the outer circumferential wall, and formed at a communication section in communication with the introduction section and the discharge section.

A continuous heating furnace according to a first aspect of the present invention includes one or more of the hermetically sealed gas heaters according to the first aspect or the second aspect; a furnace main body in which the hermetically sealed gas heater is disposed therein; and a conveyance body configured to convey a heating target in the furnace main body. In addition, the hermetically sealed gas heater ejects an exhaust gas from the ejection port toward the heating target conveyed by the conveyance body.

The hermetically sealed gas heater according to the second aspect of the present invention, in the first aspect, further includes a guide section configured to guide the exhaust gas ejected from the ejection port in an opposite direction of a conveyance direction of the heating target by the conveyance body.

Effects of the Invention

According to the present invention, it is possible to manufacture the hermetically sealed gas heater at a low cost, remove restriction in disposition place and generate a flow in an atmosphere gas around a heating target with the hermetically sealed gas heater.

EMBODIMENTS FOR CARRYING OUT THE INVENTION

Hereinafter, exemplary embodiments of the present invention will be described in detail with reference to the accompanying drawings. Dimensions, materials, and other specific numerical values described in the embodiments are merely exemplified for the purpose of easy understanding of the present invention and do not limit the present invention unless the context clearly indicates otherwise. In addition, in the description and the drawings, elements having substantially the same functions and configurations are designated by the same reference numerals and overlapping descriptions will not be repeated, or elements that are not directly related to the present invention are not shown.

(First Embodiment: Hermetically Sealed Gas Heater System 100)

Figure 1:
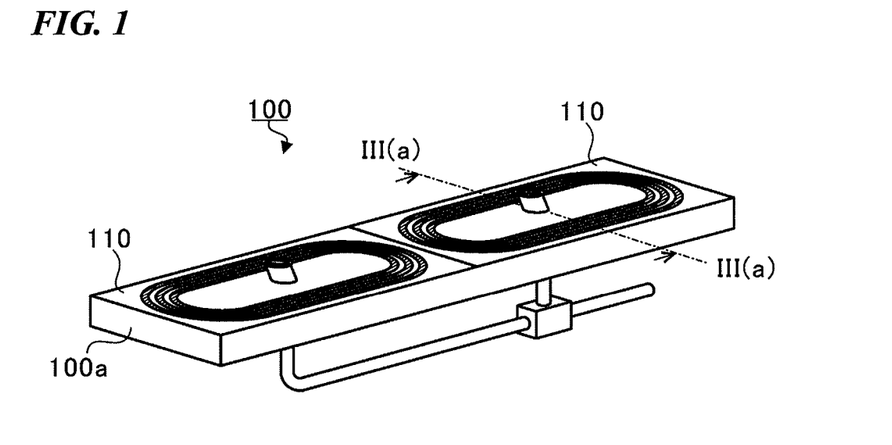
FIG. 1 is a perspective view showing an example of an appearance of a hermetically sealed gas heater system according to a first embodiment of the present invention.

FIG. 1 is a perspective view showing an example of an appearance of a hermetically sealed gas heater system 100 according to a first embodiment of the present invention. The hermetically sealed gas heater system 100 according to the embodiment is a pre-mixing type system in which city gas or the like and air as an oxidant gas for combustion are mixed before supply into a main body container. However, the hermetically sealed gas heater system 100 is not limited thereto but may be applied to a diffusion type system configured to perform so called diffusion combustion.

As shown in FIG. 1, in the hermetically sealed gas heater system 100, a plurality of (here, two) hermetically sealed gas heaters 110 are connected in parallel, a mixed gas (hereinafter referred to as a "fuel gas") of city gas or the like and air is supplied thereinto, and the fuel gas is combusted by each of the hermetically sealed gas heaters 110, performing the heating. Then, in the hermetically sealed gas heater system 100, an exhaust gas generated due to the combustion is collected. The hermetically sealed gas heater system 100 has a side surface 100a.

Figure 2:
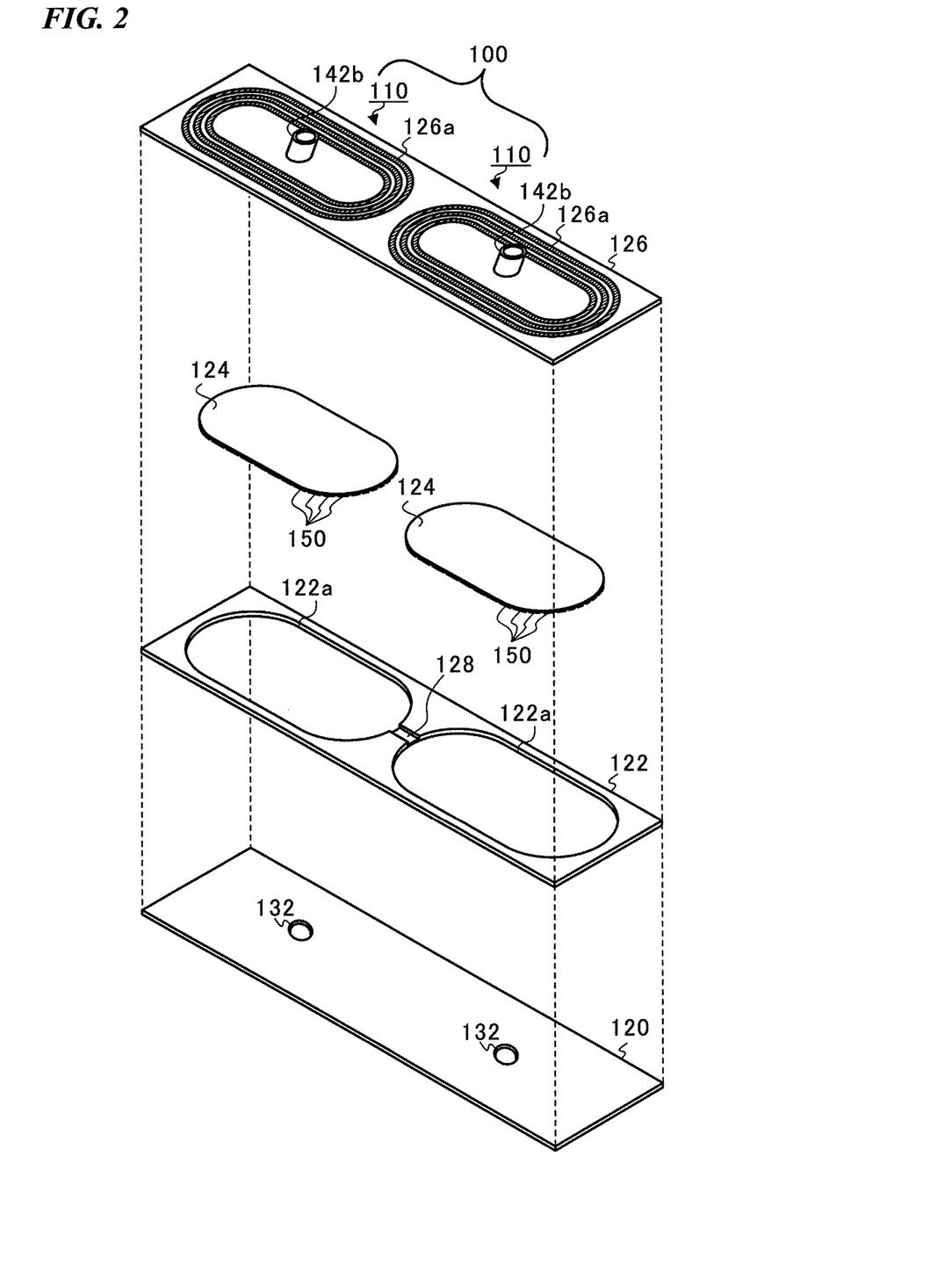
FIG. 2 is a view for explaining a structure of the hermetically sealed gas heater system according to the embodiment of the present invention.

FIG. 2 is a view for explaining a structure of the hermetically sealed gas heater system 100 according to the first embodiment. As shown in FIG. 2, the hermetically sealed gas heater system 100 includes a disposition plate 120, an outer circumferential wall 122, a partition plate 124 and a heating plate 126.

The disposition plate 120 is a flat plate member formed of a raw material having high heat resistance and oxidation resistance, for example, stainless steel (stainless use steel: SUS), a raw material having a low thermal conductivity, or the like.

The outer circumferential wall 122 is constituted by a thin plate member having a shape in which an outer circumferential surface is flush with an outer circumferential surface of the disposition plate 120, and stacked on the disposition plate 120 as shown. In the outer circumferential wall 122, the inner circumference forms a track shape (a shape constituted by two substantially parallel lines and two arcs (semi-circle) connecting the two lines), and two through-holes 122a passing in a thickness direction (a stacking direction of the outer circumferential wall 122 and the disposition plate 120) are formed.

Like the disposition plate 120, the partition plate 124 is formed of a raw material having high heat resistance and oxidation resistance such as stainless steel, a raw material having thermal conductivity such as brass, or the like. Then, the partition plate 124 is constituted by a flat plate member having an external shape that follows an inner circumferential surface of the through-hole 122a of the outer circumferential wall 122, and disposed substantially parallel to the disposition plate 120 inside the outer circumferential wall 122. In addition, the partition plate 124 has an outer circumferential surface spaced apart a certain gap from the inner circumferential surface of the through-hole 122a in a state in which the partition plate 124 is housed in the through-hole 122a of the outer circumferential wall 122.

Like the disposition plate 120, the heating plate 126 is constituted by a thin plate member formed of a raw material having high heat resistance and oxidation resistance such as stainless steel, a raw material having thermal conductivity such as brass, or the like.

In addition, a concavo-convex section 126a having concave and convex sections is formed in the heating plate 126. As a difference in deformation of thermal expansion due to a temperature difference between the heating plate 126 and the disposition plate 120 or a difference between raw materials of the heating plate 126 and the disposition plate 120 is absorbed by the concavo-convex section 126a, stress generated from a coupling portion to the outer circumferential wall 122 is reduced. For this reason, thermal fatigue and high temperature creep caused by repetition of heating and cooling can be suppressed. In addition, since an area of a radiation surface of the heating plate 126 is increased, the radiant intensity can also be increased.

Then, the heating plate 126 has an appearance, an outer circumferential surface of which is flush with outer circumferential surfaces of the disposition plate 120 and the outer circumferential wall 122, and is stacked on the outer circumferential wall 122 and the partition plate 124. Here, the heating plate 126 and the disposition plate 120 are alternately disposed to be opposite to each other substantially in parallel (substantially parallel to cause excessive enthalpy combustion in the embodiment). In addition, the outer circumferential wall 122 is disposed along outer circumferences of the heating plate 126 and the disposition plate 120, and the partition plate 124 is disposed to be opposite to the heating plate 126 and the disposition plate 120 in a space S surrounded by the heating plate 126, the disposition plate 120 and the outer circumferential wall 122.

The disposition plate 120, the partition plate 124 and the heating plate 126 may be inclined and disposed to be opposite to each other when an aperture is formed therebetween. In addition, thicknesses of the disposition plate 120, the partition plate 124 and the heating plate 126 are not limited, and the disposition plate 120, the partition plate 124 and the heating plate 126 are not limited to a flat plate shape and may be formed with varying thicknesses.

In the embodiment, the partition plate 124 is fixed to the disposition plate 120 by welding or the like through a protrusion 150 (to be described later) which is disposed at the partition plate 124. However, for example, the partition plate 124 may be fixed to a support section protruding from the disposition plate 120 or the heating plate 126 using a variety of joint methods.

As described above, the main body container of the hermetically sealed gas heater system 100 is configured to be closed by the heating plate 126 and the disposition plate 120 at upper and lower sides of the outer circumferential wall 122. Moreover, areas of upper and lower wall surfaces (outer surfaces of the heating plate 126 and the disposition plate 120) are larger than the area of an outer surface of the outer circumferential wall 122. That is, the upper and lower wall surfaces occupy most of the outer surface of the main body container.

In addition, the two hermetically sealed gas heaters 110 are configured to be connected to the hermetically sealed gas heater system 100 in parallel, and a fire shift section 128 in communication with a closed space in the connected hermetically sealed gas heaters 110 is formed at a connecting portion between the hermetically sealed gas heaters 110. However, even though the space is the closed space, the closed space may not be a perfectly closed space when the closed space is used with a gas. in the hermetically sealed gas heater system 100 of the embodiment, for example, a flame is spread to the hermetically sealed gas heaters 110 connected through the fire shift section 128 to be ignited by one ignition by an ignition device such as an ignitor (not shown) or the like.

In addition, in the embodiment, the heater main body has a configuration in which the space S is surrounded by the heating plate 126, the disposition plate 120 and the outer circumferential wall 122, and the space S is partitioned by the partition plate 124. Here, in the one heater main body, while the two hermetically sealed gas heaters 110 are connected in parallel and the two spaces are formed in the heater main body, however, the heater main body may have only one space. In other words, the one space, i.e., only one hermetically sealed gas heater 110, may be constituted by the heater main body constituted by the heating plate, the disposition plate and the outer circumferential wall.

As described above, while the two hermetically sealed gas heaters 110 are installed in the hermetically sealed gas heater system 100, since the two hermetically sealed gas heaters 110 have the same configuration, hereinafter, one of the hermetically sealed gas heaters 110 will be described.

Figure 3:
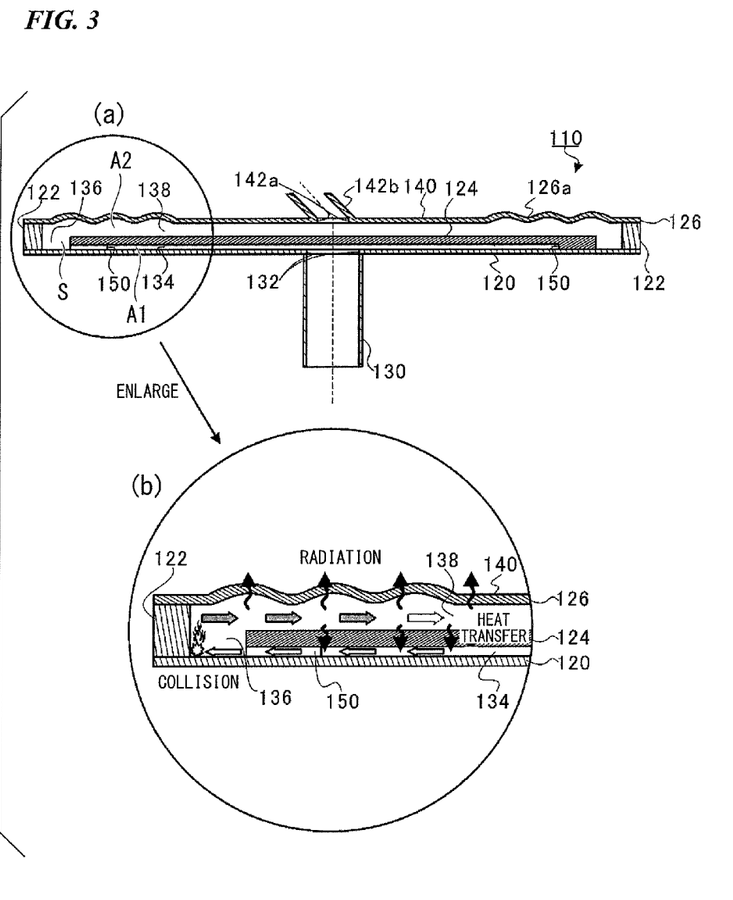
FIG. 3 is a view for explaining the hermetically sealed gas heater.

FIG. 3 is a cross-sectional view taken along line III(a)-III(a) of FIG. 1, for explaining the hermetically sealed gas heater 110. As shown in FIG. 3, an introduction hole 132 is formed in the disposition plate 120 to pass it in the thickness direction at a central portion of the hermetically sealed gas heater 110. A first piping section 130 through which a fuel gas flows is connected to the introduction hole 132, and the fuel gas flows into the main body container of the hermetically sealed gas heater 110 via the introduction hole 132.

In the main body container, an introduction section 134 and a discharge section 138 are partitioned by the partition plate 124 and are adjacent to each other.

The introduction section 134 is formed by an aperture A1 between the disposition plate 120 and the partition plate 124, and the fuel gas introduced from the introduction hole 132 is radially introduced into a combustion chamber 136.

The combustion chamber 136 is formed in a communication section in communication with the introduction section 134 and the discharge section 138 in the space S surrounded by the disposition plate 120, the heating plate 126 and the outer circumferential wall 122. In the embodiment, the combustion chamber 136 faces an outer circumferential end of the partition plate 124 and is disposed along the outer circumferential wall 122. An igniting apparatus (not shown) is installed at an arbitrary position of the combustion chamber 136. Then, in the combustion chamber 136, the fuel gas introduced from the introduction section 134 is combusted, and an exhaust gas generated by the combustion is discharged toward the discharge section 138.

The discharge section 138 is formed by an aperture A2 between the heating plate 126 and the partition plate 124, and the exhaust gas generated by combustion in the combustion chamber 136 is concentrated on a central portion of the hermetically sealed gas heater 110.

As described above, in the main body container, since the introduction section 134 and the discharge section 138 are formed to be adjacent to each other, heat of the exhaust gas is transferred to the fuel gas through the partition plate 124, and thus the fuel gas can be preheated.

A radiation surface 140, which is an outer surface of the heating plate 126, is heated by the exhaust gas flowing through the discharge section 138 or the combustion in the combustion chamber 136, and transfers the radiant heat to the heating target (heat transfer).

An ejection port 142a, which is a hole passes the heating plate 126 in the thickness direction at the central portion of the hermetically sealed gas heater 110, is formed in the heating plate 126. In addition, a guide section 142b configured to incline a flow direction of the exhaust gas from a direction perpendicular to the radiation surface 140 to a predetermined direction is formed at the ejection port 142a near the radiation surface 140. Then, the exhaust gas having heated the radiation surface 140 is discharged to the outside of the hermetically sealed gas heater 110 via the ejection port 142a.

Next, the flow of the fuel gas and the exhaust gas will be described in detail. A portion of FIG. 3 designated by (b) is an enlarged view of a portion surrounded by a circle designated by (a) of FIG. 3. In the portion designated by (b), a white arrow designates a flow of the fuel gas, a gray arrow designates a flow of the exhaust gas, and a black arrow designates movement of the heat. When the fuel gas is introduced into the first piping section 130, the fuel gas flows from the introduction hole 132 into the introduction section 134, and flows toward the combustion chamber 136 while radially spreading in a horizontal direction. Then, the fuel gas collides with the outer circumferential wall 122 in the combustion chamber 136 and a flow velocity thereof is decreased, and after combustion in the combustion chamber, becomes a high temperature exhaust gas. The exhaust gas flows through the discharge section 138 to transfer heat to the radiation surface 140 of the heating plate 126 and then flows toward the ejection port 142a.

The partition plate 124 is formed of a raw material that allows relatively easy heat conduction, and the heat of the exhaust gas passing through the discharge section 138 is transferred to the fuel gas passing through the introduction section 134 via the partition plate 124. In the embodiment, since the exhaust gas flowing through the discharge section 138 and the fuel gas flowing through the introduction section 134 become opposite flows (counter flows) that sandwich the partition plate 124, the fuel gas can be efficiently preheated by the heat of the exhaust gas, and high thermal efficiency can be obtained. The combustion of the fuel gas can be stabilized by preheating and combustion of the fuel gas, known as excessive enthalpy combustion, and therefore, a concentration of CO (carbon oxide) generated by imperfect combustion can be suppressed to a very low concentration.

Further, in order to prevent backfire, the protrusion 150 is formed at a boundary between the introduction section 134 and the combustion chamber 136. The protrusion 150 is a member configured to prevent the flame from flowing toward the introduction section 134 (a combustion reaction is not propagated toward the introduction section 134). The protrusion 150 will be described with reference to FIGS. 4A and 4B.

Figure 4A:
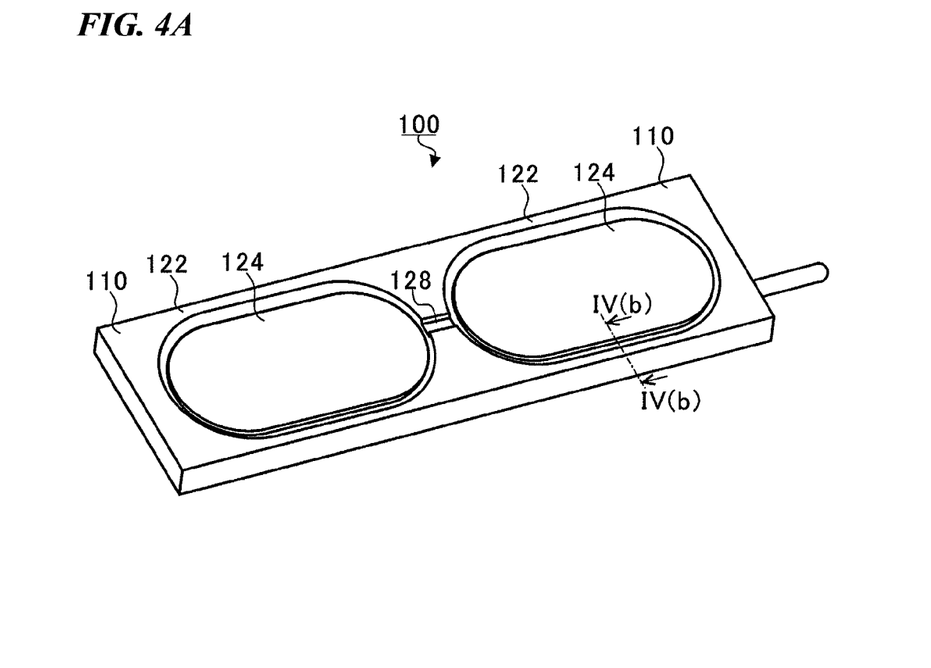
FIG. 4A is a perspective view of the hermetically sealed gas heater system except for a heating plate, for explaining a plurality of protrusions.
Figure 4B:
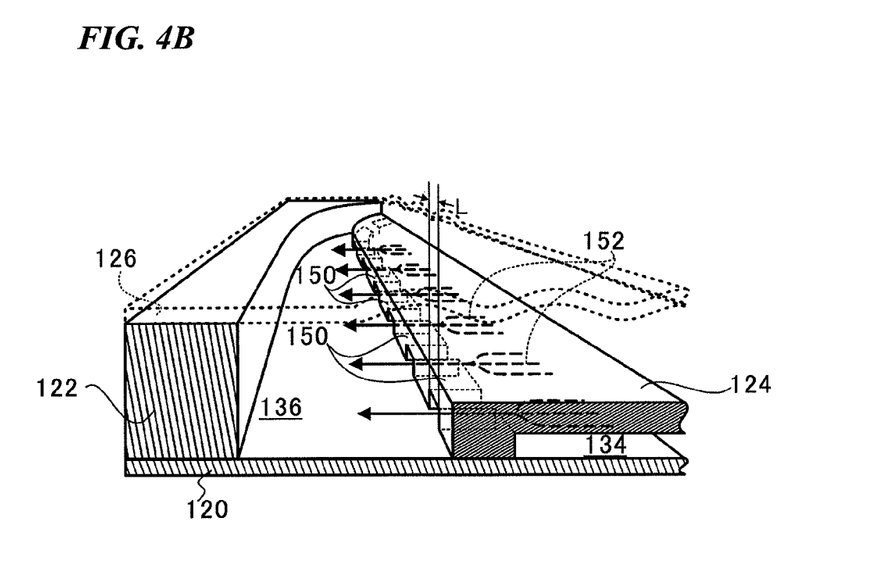
FIG. 4B is a view showing a cross-section taken along line IV(b)-IV(b) of FIG. 4A when seen in the direction indicated by an arrow.

FIGS. 4A and 4B are views for explaining the plurality of protrusions 150. FIG. 4A is a perspective view of the hermetically sealed gas heater system 100 except for the heating plate 126, and FIG. 4B is a view showing a cross-section taken along line IV(b)-IV(b) of FIG. 4A, when seen in a direction indicated by an arrow. In FIG. 4B, for the convenience of understanding of structures of the plurality of protrusions 150, portions of the heating plate 126 and the protrusion 150 hidden by the partition plate 124 are shown by broken lines. In addition, an arrow 152 represents a direction of the flow of the fuel gas. The introduction section 134 has a flow path in which the cross-section thereof is narrowed by the plurality of protrusions 150 formed at the partition plate 124. The fuel gas flows into the combustion chamber 136 through the aperture in the introduction section 134 between the adjacent protrusions 150 as shown by a partially enlarged view of (b) of FIG. 3 and FIG. 4B.

Next, a continuous heating furnace 200 configured to heat heating targets sequentially conveyed into a furnace using the hermetically sealed gas heater system 100 will be described.

Figure 5A:
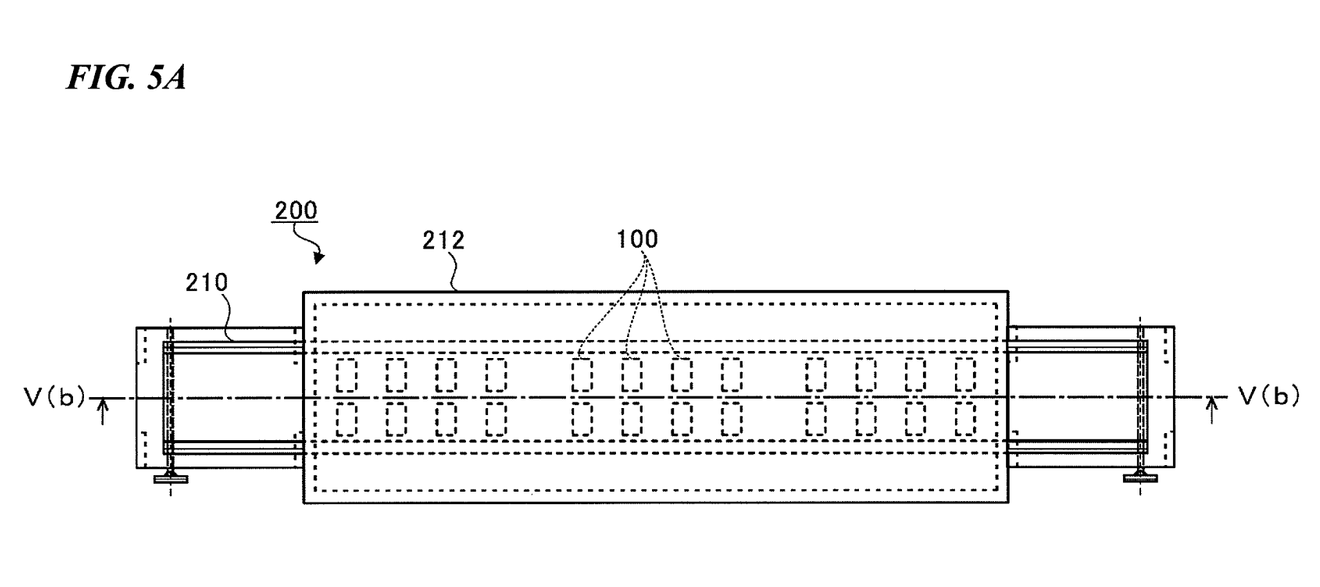
FIG. 5A is a plan view of a continuous heating furnace for explaining an outline of the continuous heating furnace.
Figure 5B:
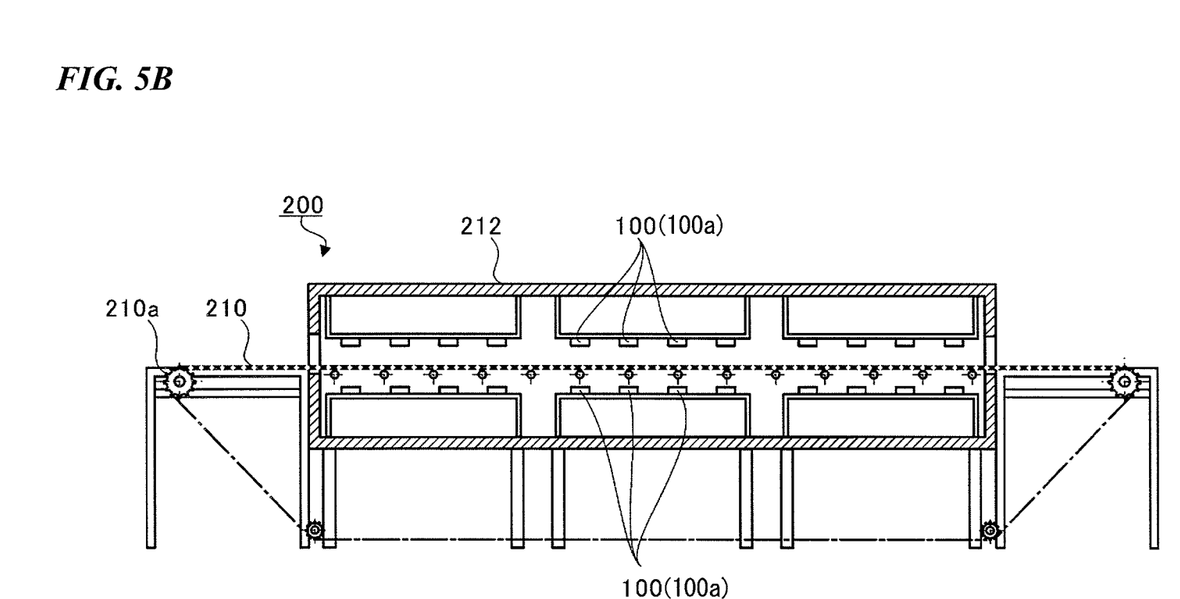
FIG. 5B is a cross-sectional view taken along line V(b)-V(b) of FIG. 5A.

FIGS. 5A and 5B are views for explaining an outline of the continuous heating furnace 200. In particular, FIG. 5A shows a plan view of the continuous heating furnace 200 and FIG. 5B shows a cross-sectional view taken along line V(b)-V(b) of FIG. 5A.

A conveyance body 210 is constituted by a conveyor such as a belt or the like, and rotated by a gear 210a that receives power from a motor (not shown) to convey the heating target. While the heating target is placed on the conveyance body 210, the heating target may be hung by a hoist mechanism (not shown) installed at the conveyance body 210.

A furnace main body 212 forms a heating space configured to partially or entirely surround the conveyance body 210. In the furnace main body 212, the hermetically sealed gas heater systems 100 are vertically disposed upward and downward to sandwich the conveyance body 210. In FIG. 5B, a side surface 100a of the hermetically sealed gas heater system 100 of FIG. 1 is shown.

A conveyance direction of a heating target 156 conveyed in the furnace main body 212 of the continuous heating furnace 200 and a direction of a flow of the exhaust gas discharged from the ejection port 142a of one of the two hermetically sealed gas heaters 110 included in the hermetically sealed gas heater system 100 disposed in the furnace main body 212 will be described with reference to FIG. 6.

Figure 6:
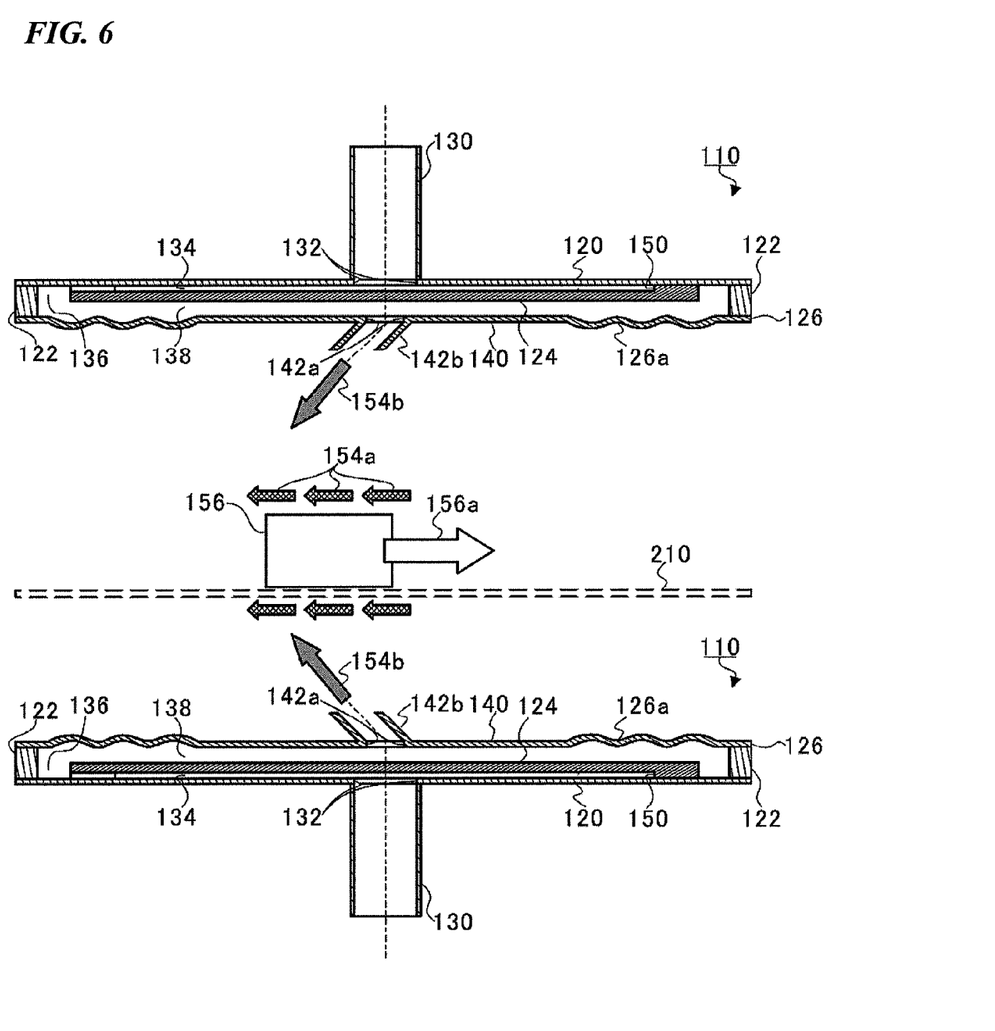
FIG. 6 is a view for explaining an ejection direction of an exhaust gas and a conveyance direction of a heating target.

FIG. 6 is a view for explaining an ejection direction of the exhaust gas and a conveyance direction of the heating target 156. In FIG. 6, cross-sectional views of the heating target 156, the conveyance body 210 and the two hermetically sealed gas heaters 110 opposite to each other and sandwiching the conveyance body 210 at the same positions as in FIG. 3 in the continuous heating furnace 200 are shown.

The exhaust gas ejected from the ejection port 142a of the hermetically sealed gas heater 110 flows along the guide section 142b in a direction shown by a gray arrow 154b. On the other hand, a conveyance direction of the heating target 156 is a direction shown by a white arrow 156a.

As shown in FIG. 6, the hermetically sealed gas heater 110 ejects the exhaust gas from the ejection port 142a toward the heating target 156 conveyed by the conveyance body 210.

In this way, since the exhaust gas is ejected in a direction from the ejection port 142a to approach the heating target 156, the hermetically sealed gas heater 110 accelerates a convection current from the radiation surface 140 toward the heating target 156. For this reason, radiation heating is added to accelerate convection heat transfer, and thermal efficiency of the heater is increased.

In addition, for example, when foods are baked or the like, quality of the heating target 156 may be improved by removing vapor around the heating target 156 while baking. In addition, when the continuous furnace is used to dry painting, VOC volatilized around the heating target 156 should be collected.

In the hermetically sealed gas heater 110 of the embodiment, even when an exhaust fan or the like is not newly installed, flow velocity of the exhaust gas can be increased by passing through the ejection port 142a in which the hole diameter thereof is throttled, and ejected; and a flow can be generated in an atmosphere gas around the heating target 156. Provisionally, even when the flow rate of the exhaust gas is insufficient and the exhaust fan is subsidiarily needed, the capacity of the exhaust fan can be reduced.

In addition, as shown in FIG. 6, the guide section 142b is inclined with respect to a vertical direction of the radiation surface 140. The hermetically sealed gas heater system 100 is disposed at the furnace main body 212 such that an inclination thereof is directed upward in the conveyance direction of the heating target 156. For this reason, the guide section 142b guides the exhaust gas ejected from the ejection port 142a in an opposite direction of the conveyance direction of the heating target 156 by the conveyance body 210. As a result, the atmosphere gas around the heating target 156 flows in an opposite direction of the conveyance direction as shown by a hatched arrow 154a. In addition, the guide section 142b may be disposed to guide the exhaust gas ejected from the ejection port 142a in the conveyance direction of the heating target 156 by the conveyance body 210.

(Second Embodiment)

Next, a partition plate 224 and a second piping section 260 of a second embodiment of the present invention will be described. In the second embodiment, the hermetically sealed gas heater 110 further includes the second piping section 260 and is distinguished from the first embodiment in the partition plate 224 and the second piping section 260. Accordingly, in the following description, a description of the same components as those of the first embodiment will be omitted, and only the partition plate 224 and the second piping section 260 having different configurations will be described.

Figure 7:
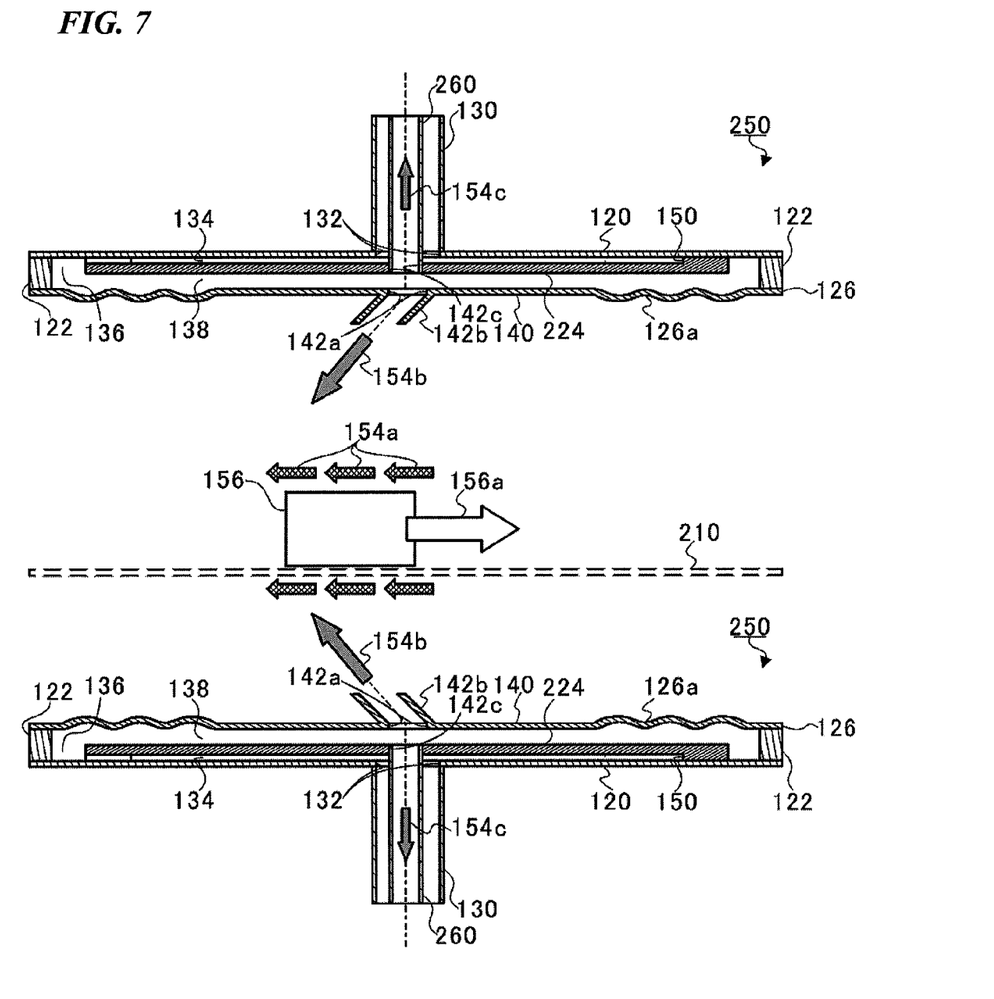
FIG. 7 is a view for explaining a hermetically sealed gas heater according to a second embodiment of the present invention.

FIG. 7 is a view for explaining a hermetically sealed gas heater 250 according to the second embodiment. Like FIG. 6, FIG. 7 shows a cross-sectional view of the heating target 156, the conveyance body 210 and the two hermetically sealed gas heaters 250 opposite to each other to sandwich the conveyance body 210 at the same positions as in FIG. 3 in the continuous heating furnace 200.

An exhaust hole 142c configured to guide some of the exhaust gas from the discharge section 138 is formed in the partition plate 224. Then, the second piping section 260 is fitted into an inner circumferential section of the exhaust hole 142c.

The second piping section 260 is disposed in the first piping section 130. That is, the first piping section 130 and the second piping section 260 are formed in a dual pipe. Then, some of the exhaust gas guided by the discharge section 138 is discharged to the second piping section 260. In addition, the second piping section 260 has a function of transferring heat from the exhaust gas to the fuel gas flowing through the first piping section 130.

In the first embodiment, the partition plate 124 is fixed to the disposition plate 120 via the protrusion 150. In the present embodiment, a portion (an edge section) of the disposition plate 120 in which the introduction hole 132 is formed is fixed to a tip of the first piping section 130, and the exhaust hole 142c of the partition plate 224 is fixed to a tip of the second piping section 260 protruding from the first piping section 130. Then, the disposition plate 120 and the partition plate 224 are spaced apart from each other by a positional difference between the tip of the first piping section 130 and the tip of the second piping section 260.

In the above-mentioned configuration, the exhaust gas flowing through the discharge section 138 is divided into the ejection port 142a and the exhaust hole 142c. The exhaust gas discharged from the ejection port 142a of the hermetically sealed gas heater 250 flows along the guide section 142b in a direction shown by a gray arrow 154b.

In the above-mentioned second embodiment, the same effect as of the first embodiment can be realized. That is, in the hermetically sealed gas heater 250, a flow in a direction opposite to the conveyance direction can be generated in the atmosphere gas around the heating target 156, and further, convection from the radiation surface 140 toward the heating target 156 is accelerated, increases the thermal efficiency of the heater.

In addition, in particular, in the second embodiment, some of the exhaust gas is ejected toward the heating target 156, and the rest is discharged from the second piping section 260 (shown by a gray arrow 154c). For this reason, by setting a diameter or the like of the ejection port 142a or the exhaust hole 142c at the planning stage, the exhaust gas ejected toward the heating target 156 can be adjusted to a desired amount.

(Third Embodiment)

Next, a heating plate 326 according to a third embodiment of the present invention will be described. In the third embodiment, the heating plate 326 is different from that of the first embodiment. Accordingly, in the following description, descriptions of the same components as those of the first embodiment will be omitted, and only the heating plate 326 having a different configuration will be described.

Figure 8:
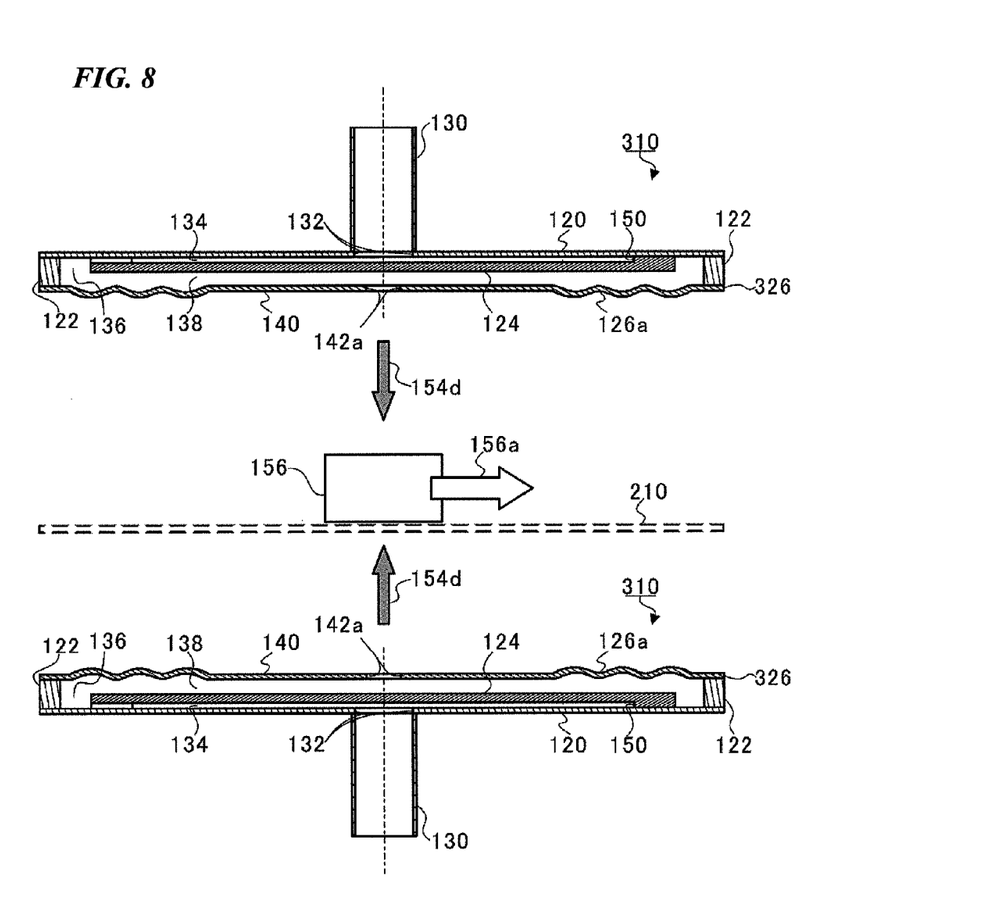
FIG. 8 is a view for explaining a hermetically sealed gas heater according to a third embodiment of the present invention.

FIG. 8 is a view for explaining a hermetically sealed gas heater 310 according to the third embodiment. In FIG. 8, like FIG. 6, cross-sectional views of the heating target 156, the conveyance body 210 and the two hermetically sealed gas heaters 310 opposite to each other and sandwiching the conveyance body 210 at the same positions as in FIG. 3 in the continuous heating furnace 200 are shown.

In the embodiment, while the ejection port 142a is formed at the heating plate 326, which is different from the first embodiment, the guide section 142b is not formed. Even in the third embodiment, like the first embodiment, a flow can be generated in the atmosphere gas around the heating target 156, and convection from the radiation surface 140 toward the heating target 156 is accelerated, increasing the thermal efficiency of the heater.

In addition, in particular, in the third embodiment, the exhaust gas can be discharged toward the heating target 156 (shown by a gray arrow 154d) by only a simple configuration in which a through-hole is simply formed in the heating plate 326 as the ejection port 142a, and specific manufacturing cost for the through-hole is not needed.

(Fourth Embodiment)

Next, a continuous heating furnace 400 according to a fourth embodiment of the present invention will be described. In addition, in the fourth embodiment, a configuration of the continuous heating furnace 400 is different from that of the third embodiment, and the configuration of the hermetically sealed gas heater 310 installed in the continuous heating furnace 400 is the same as that of the third embodiment. Accordingly, in the following description, descriptions of the same components as the third embodiment will be omitted, and only the continuous heating furnace 400 having a different configuration will be described.

Figure 9:
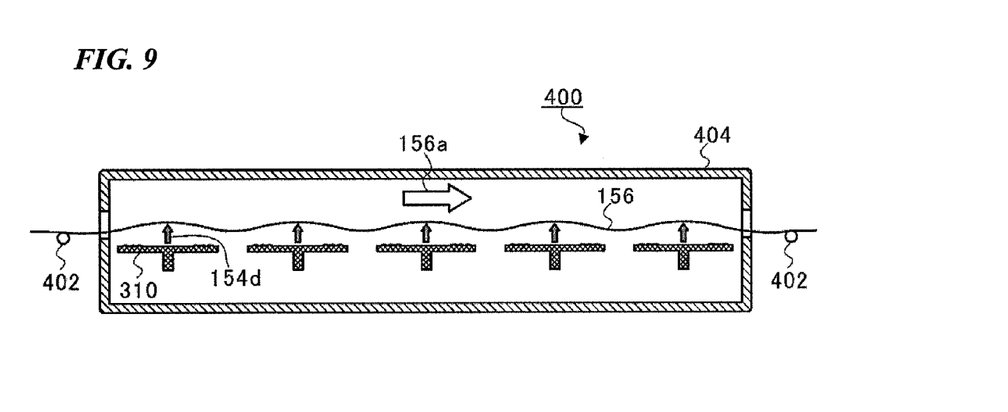
FIG. 9 is a view for explaining a continuous heating furnace according to a fourth embodiment of the present invention.

FIG. 9 is a view for explaining the continuous heating furnace 400 according to the fourth embodiment. In FIG. 9, a cross-sectional view of the heating target 156 and one of the hermetically sealed gas heaters 310 of the hermetically sealed gas heater system disposed at a lower side in a vertical direction of the heating target 156 in the continuous heating furnace 400 is shown. Here, for the convenience of understanding, a cross-section of the hermetically sealed gas heater 310 is hatched.

The continuous heating furnace 400 heats the heating target 156 conveyed into a furnace main body 404 by rotation of a roller 402. In the embodiment, the heating target 156 is, for example, a metal strip, and conveyed in a direction indicated by an arrow 156a.

The hermetically sealed gas heater 310 ejects the exhaust gas from the ejection port 142a in a direction of a gray arrow 154d shown in FIG. 9. The heating target 156, while being heated by the hermetically sealed gas heater 310, receives a pressure of the exhaust gas ejected from the ejection port 142a and is conveyed with no contact with the hermetically sealed gas heater 310 in the furnace main body 404 (by floating with respect to the hermetically sealed gas heater 310).

Like the continuous heating furnace 400 of the embodiment, in a so called floating furnace configured to convey the heating target 156 in the furnace main body 404 in a non-contact manner, the hermetically sealed gas heater 310 can simultaneously perform heating processing of the heating target 156 and ejection processing of a fluid for floating a portion of the heating target 156. For this reason, new equipment for the ejection processing of the fluid is not needed and the number of newly installed apparatuses can be suppressed, and the manufacturing cost or operating cost can be reduced.

In addition, in the above-mentioned embodiment, while the combustion chamber 136 is formed along the outer circumferential wall 122, the combustion chamber 136 is not limited thereto but may be disposed in a space surrounded by the outer circumferential wall 122, the heating plates 126 and 326, and the disposition plate 120. However, in order to sufficiently secure a preheating effect of the fuel gas by the exhaust gas, the combustion chamber 136 may be disposed at a position which is closer to the outer circumferential wall 122 than an intermediate position from the introduction hole 132 formed in the disposition plate 120 to the outer circumferential wall 122, for example, in a space between the heating plates 126, 326 and the partition plates 124, 224 or a space between the partition plate 124 and the disposition plate 120.

In addition, in the above-mentioned embodiment, while the configuration in which the introduction section 134 and the discharge section 138 are formed adjacent to each other and the fuel gas is preheated with heat of the exhaust gas passing through the partition plate 124 has been exemplarily described, the hermetically sealed gas heater may not include a configuration for preheating the fuel gas using the exhaust gas.

In addition, the introduction hole 132, the exhaust hole 142c and the ejection port 142a may be disposed at any position, not limited to central positions of the disposition plate 120, the partition plates 124 and 224, and the heating plates 126 and 326.

Further, in the above-mentioned embodiment, while the configuration in which the plurality of hermetically sealed gas heater systems 100, each of which includes the two continuously installed hermetically sealed gas heaters, are disposed in the continuous heating furnace 200 has been exemplarily described, the hermetically sealed gas heater may be solely disposed in the continuous heating furnace 200.

Hereinabove, while the exemplary embodiments of the present invention have been described with reference to the accompanying drawings, it is needless to say that the present invention is not limited thereto. It will be apparent to those skilled in the art that various modifications and variations may be made without departing from the spirit of the following claims and will fall into the technical scope of the present invention.

INDUSTRIAL APPLICABILITY

The present invention can be applied to the hermetically sealed gas heater having the flow path, the radiation surface of which is heated by the exhaust gas, and the continuous heating furnace using the hermetically sealed gas heater.

DESCRIPTION OF REFERENCE NUMERALS 10, 250, 310 . . . hermetically sealed gas heater
120 . . . disposition plate
122 . . . outer circumferential wall
124, 224 . . . partition plate
126, 326 . . . heating plate
132 . . . introduction hole
134 . . . introduction section
136 . . . combustion chamber
138 . . . discharge section
140 . . . radiation surface
142a . . . ejection port
142b . . . guide section
156 . . . heating target
200, 400 . . . continuous heating furnace
210 . . . conveyance body
212, 404 . . . furnace main body

The invention claimed is:

1. A hermetically sealed gas heater comprising:
a heater main body;
an introduction hole configured to introduce a fuel gas into the heater main body;
a combustion chamber configured to combust the fuel gas introduced from the introduction hole; and
a discharge section into which an exhaust gas generated by combustion in the combustion chamber is guided,
wherein the heater main body comprises a heating plate which is constituted by a thin plate member and has a radiation surface heated by the exhaust gas flowing through the discharge section and configured to transfer radiant heat to a heating target in a state in which the radiation surface is spaced apart from the heating target, the radiation surface being an external surface of the heater main body, and
an ejection port configured to partially or entirely eject the exhaust gas toward the heating target is formed at the radiation surface, the ejection port passing through the heating plate in a thickness direction of the heating plate at a central portion of the hermetically sealed gas heater, the exhaust gas being partially or entirely ejected from the ejection port toward the heating target so as to accelerate a convection current from the radiation surface toward the heating target.

2. The hermetically sealed gas heater according to claim 1, wherein the heater main body further comprises:
the heating plate;
a disposition plate disposed opposite to the heating plate and having the introduction hole;
an outer circumferential wall disposed along outer circumferences of the heating plate and the disposition plate; and
a partition plate disposed in a space surrounded by the heating plate, the disposition plate and the outer circumferential wall such that the partition plate and the disposition plate are separated from each other to form a first aperture therebetween, the first aperture forming an introduction section into which the fuel gas flowing from the introduction hole is guided, and that the partition plate and the heating plate are separated from each other to form a second aperture therebetween, the second aperture forming the discharge section, and
wherein the combustion chamber is disposed in the space surrounded by the heating plate, the disposition plate and the outer circumferential wall, and communicates with the introduction section and the discharge section.

3. A continuous heating furnace comprising:
one or more of the hermetically sealed gas heaters according to claim 1;
a furnace main body in which the hermetically sealed gas heater is disposed therein; and
a conveyance body configured to convey the heating target in the furnace main body,
wherein the hermetically sealed gas heater ejects the exhaust gas from the ejection port toward the heating target conveyed by the conveyance body.

4. A continuous heating furnace comprising:
one or more of the hermetically sealed gas heaters according to claim 2;
a furnace main body in which the hermetically sealed gas heater is disposed; and
a conveyance body configured to convey the heating target in the furnace main body,
wherein the hermetically sealed gas heater ejects the exhaust gas from the ejection port toward the heating target conveyed by the conveyance body.

5. The hermetically sealed gas heater according to claim 1, wherein a guide section configured to incline a flow direction of the exhaust gas from a direction perpendicular to the radiation surface to a predetermined direction is formed at the ejection port.

* * * * *